M. J. TRUMBLE.
METHOD AND APPARATUS FOR DEHYDRATING EMULSIONS.
APPLICATION FILED AUG. 16, 1915.
1,304,124.
Patented May 20, 1919.
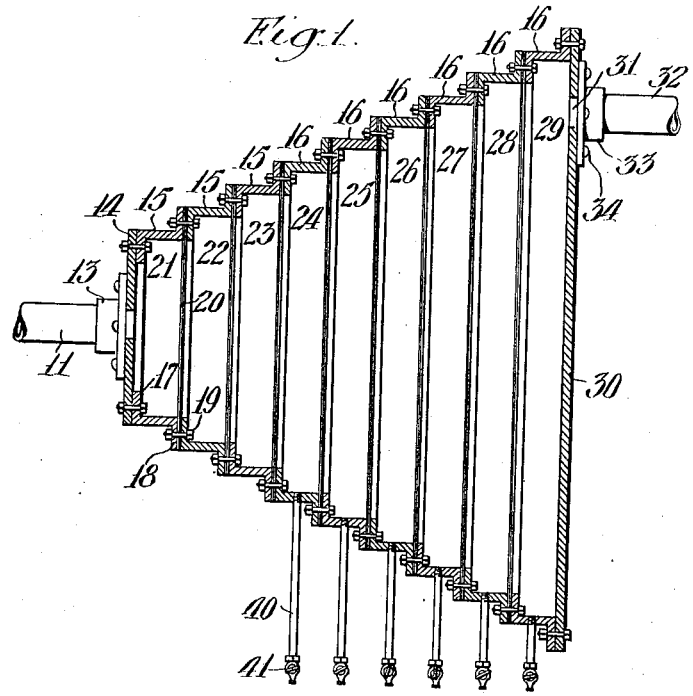
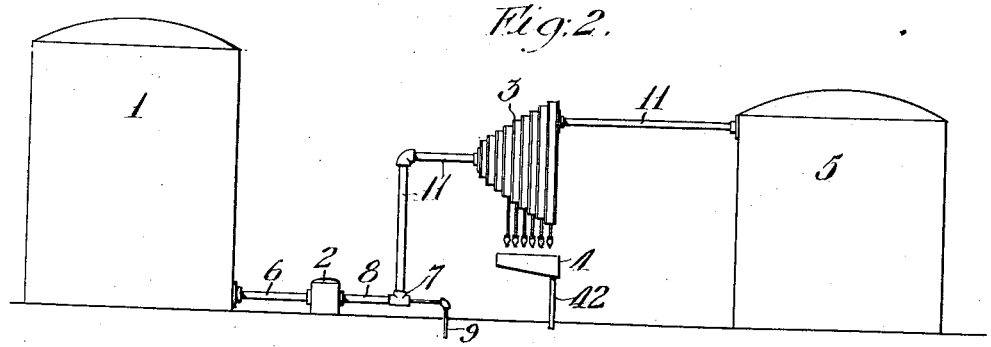
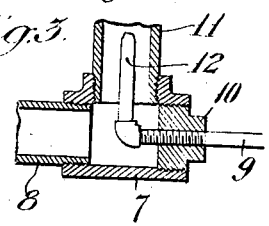
Witnesses:
Inventor
Milon J. Trumble
by Townsend Graham + Lewis
his Attorneys

UNITED STATES PATENT OFFICE.

MILON J. TRUMBLE, OF LOS ANGELES, CALIFORNIA, ASSIGNOR TO SHELL COMPANY OF CALIFORNIA, A CORPORATION OF CALIFORNIA.

METHOD AND APPARATUS FOR DEHYDRATING EMULSIONS.

1,304,124.  Specification of Letters Patent.  Patented May 20, 1919.

Application filed August 16, 1915. Serial No. 45,844.

*To all whom it may concern:*

Be it known that I, MILON J. TRUMBLE, a citizen of the United States, residing at Los Angeles, in the county of Los Angeles and State of California, have invented a new and useful Method and Apparatus for Dehydrating Emulsions, of which the following is a specification.

My invention relates to the art of removing water from petroleum oils.

Such oils in their natural state often contain a considerable proportion of water which must be removed before the oil can be applied to most of its commercial uses. Water may also be introduced into oil during its transportation in pipe lines, or otherwise.

Water is not directly soluble in petroleum and is found in the oil in the form of water masses. This water may be in the form of large masses or globules which will separate from the oil, due to its different specific gravity, if it is allowed to stand, or it may be in the form of an emulsion, the fine particles of which remain in suspension in the oil even if the emulsion is allowed to stand for long periods.

The first object of my invention is to provide an apparatus which will separate water from oil, such an apparatus being commonly called a dehydrator. I have found that by passing a mixture of oil and water through porous diaphragms that the diaphragms tend to separate the oil and water, the oil passing through the diaphragms, and the water being caught by the diaphragms. In practice I prefer to use diaphragms formed of linen cloth. I have found further that where several such diaphragms are aranged in a series, the oil being passed successively through them, that the first diaphragms do not seem to be effective and that it is only after the emulsion has passed through several such diaphragms that any separation of water takes place.

The second object of my invention is to provide a dehydrator in which a plurality of porous diaphragms are used, these diaphragms being so associated that the oil passes through them successively.

As the first diaphragms through which the oil passses do not directly separate the oil, the diaphragms may have a small area. I find further that the emulsion must be at, or near, atmospheric pressure to allow the water to readily escape. It is therefore desirable to make the pressure on the last diaphragms of the series as small as possible and therefore desirable to give these diaphragms as large an area as possible.

The third object of my invention is to provide a dehydrator consisting of a series of porous diaphragms so arranged that the emulsion passes through the first diaphragms of the series at a certain rate of speed, and under a certain pressure, the speed decreasing and the pressure falling on succeeding diaphragms. This I find it most convenient to accomplish by making each diaphragm of a larger area than the preceding one.

Further objects and advantages will be evident hereinafter.

In the drawings which are for illustrative purposes:—

Figure 1 is an elevation of one form of my invention certain of the parts being shown in cross section to better illustrate the internal structure.

Fig. 2 is a diagrammatic elevation showing the dehydrator and connected apparatus.

Fig. 3 shows an enlarged section through the steam injection means.

In the ordinary use of the dehydrator I provide an emulsion tank 1, a pump 2, a dehydrator 3, a drain basin 4, and an oil tank 5. The pump 2 draws emulsion from the tank 1 through a pipe 6, and forces it into a steam inlet T 7 through a pipe 8. A steam pipe 9 is secured in a plug 10, secured in the T 7, the pipe 9 feeding steam into the interior of an emulsion inlet pipe 11 through a steam nozzle 12. The pipe 11 is secured in a flange 13 bolted to the inlet end plate 14 of the dehydrator 3.

The dehydrator 3 consists of an inclosing shell formed of a series of cast sections 15 and 16, each section having an inwardly extending flange 17 on one end, and an outwardly extending flange 18 on the other. The outwardly extending flange 18 of one section is secured to the inwardly extending flange 17 of the next section by means of bolts 19. A series of diaphragms 20 are provided each diaphragm being clamped between the flanges 17 and 18 and extending completely across the interior of the dehydrator dividing it into a series of compartments 21, 22, 23, 24, 25, 26, 27, 28, and 29. I prefer to make the diaphragm 20 of a single thickness of heavy wire cloth or gauze for mechanical strength, and two thicknesses of linen cloth. An outlet cover 30 closes the end of the last section 16, an opening 31 being provided near the top thereof communicating with the interior of an oil outlet pipe 32 which is secured in a flange 33 secured to the cover 30 by bolts 34.

No water discharge is necessary from the first three compartments 21, 22, and 23, as little or no water is separated therein. Water is, however, separated from the oil in the succeeding compartments 24, 25, 26, 27, 28, and 29, and water outlet pipes 40 are provided in the bottom of each of the sections 16. Each of the water outlet pipes 40 is provided with a pet cock 41 by which the rate of flow can be regulated. Each of the pet cocks 41 discharges into the drain basin 4 which discharges through a pipe 42 into a sewer not shown. The oil outlet pipe 32 discharges into the oil storage tank 5.

The method of operation is as follows: Emulsion flows from the tank 1 through the pipe 6 being forced by the pump 2 through pipes 8 and 11 into the first compartment 21 of the hydrator 3. Steam is injected into the emulsion through the steam nozzle 12 for the purpose of heating same. The emulsion travels from compartment 21 to succeeding compartments through the diaphragms 20. In practice no separation takes place before compartment 24, in which some separation of water takes place and a small stream of water is allowed to escape through the pet cock 41. More water is separated in compartments 25 and 26, the bulk of the separation taking place therein, and the oil flowing into compartment 27 being nearly free from water. The small amount of water in the oil at that point is caught in the bottom of compartments 27, 28, and 29, and drawn off through the pet cocks 41, the oil delivered to the pipe 32 being practically free from water. This oil is delivered by the pipe 32 to the oil storage tank 5.

I do not attempt to describe the theory on which my invention works. It may be that the fine water particles in passing through the first three of the diaphragms 20 are consolidated or squeezed into larger drops which are caught by the succeeding diaphragms, these large drops running down the surface of the diaphragms, collecting in the bottom of each compartment, and being drawn off through the pipes 40 and the pet cocks 41. Whatever the theory may be, the apparatus functions as described to free very stubborn emulsions from salt water, and deliver oil commercially free from water.

I claim as my invention:—

1. A dehydrator for petroleum oils comprising an inclosing shell the diameter of which increases progressively from the inlet to the outlet end, a series of porous diaphragms dividing the shell into a series of compartments, each of the diaphragms being of larger diameter than that immediately preceding it in order, and means for passing the emulsion in order through the various diaphragms.

2. The process of removing water from an emulsion of oil and water which consists in passing the emulsion through porous diaphragms which are progressively increased in area to allow the time of separation for the water and other impurities to be progressively increased.

In testimony whereof I have hereunto set my hand at Los Angeles, California, this 9th day of August, 1915.

MILON J. TRUMBLE.